Figure 1:
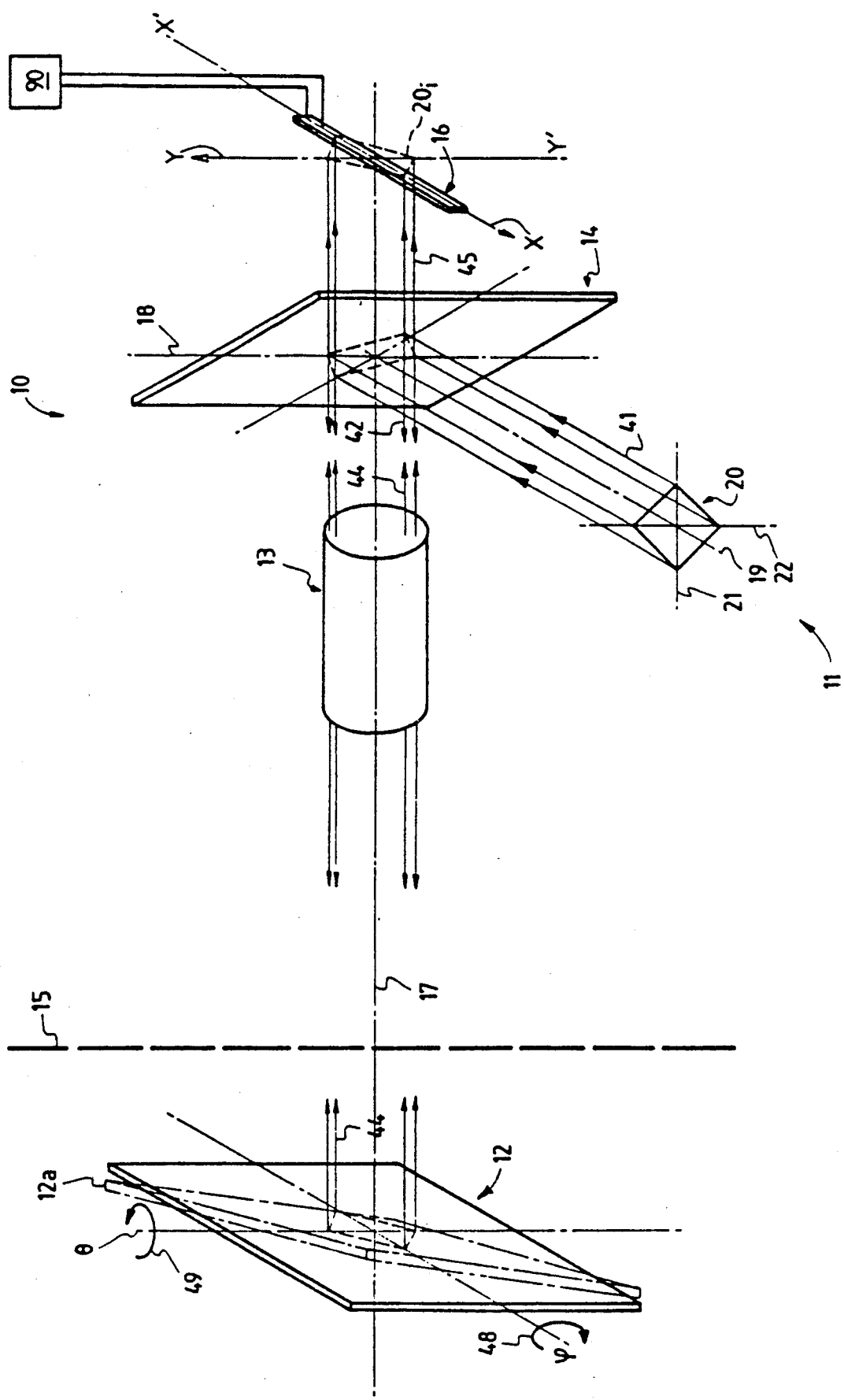

United States Patent [19]

Singer et al.

[11] Patent Number: 5,044,751
[45] Date of Patent: Sep. 3, 1991

[54] LIGHT SOURCE FOR AN OPTICAL SENSOR AND OPTICAL MEASURING DEVICE USING SAME

[75] Inventors: Christian Singer, Le Cannet; Guy Cerutti-Maori, Cannes La Bocca, both of France

[73] Assignee: Aerospatiale Societe Nationale Industrielle, Paris, France

[21] Appl. No.: 393,912

[22] PCT Filed: Nov. 29, 1988

[86] PCT No.: PCT/FR88/00585
§ 371 Date: Jul. 20, 1989
§ 102(e) Date: Jul. 20, 1989

[87] PCT Pub. No.: WO89/05437
PCT Pub. Date: Jun. 15, 1989

[30] Foreign Application Priority Data

Nov. 30, 1987 [FR] France .............................. 87 16569

[51] Int. Cl.⁵ ............................................. G01B 11/00
[52] U.S. Cl. ..................................... 356/375; 356/138; 356/152
[58] Field of Search ............... 356/141, 152, 153, 373, 356/375, 400, 138

[56] References Cited

U.S. PATENT DOCUMENTS

| | | | |
|---|---|---|---|
| 3,197,643 | 7/1965 | Morris | 356/152 |
| 4,330,212 | 5/1982 | Miller | 356/354 |
| 4,869,591 | 9/1989 | MacGregor | 356/138 |

FOREIGN PATENT DOCUMENTS

| | | | |
|---|---|---|---|
| 8808953 | 11/1988 | European Pat. Off. | |
| 2742223 | 4/1978 | Fed. Rep. of Germany | 356/141 |
| 3311945 | 10/1984 | Fed. Rep. of Germany | |
| 2322356 | 3/1977 | France | |

OTHER PUBLICATIONS

Hooker, IBM Technical Disclosure Bulletin, vol. 19, No. 9, Feb. 1977, pp. 3349-3350.

Primary Examiner—F. L. Evans
Attorney, Agent, or Firm—Browdy and Neimark

[57] ABSTRACT

Light source for an optical detector of the position of a body, the latter being measured by the relative position(s) of spots of light projected by the source on a linear detection element. Said source is in the form of a flat luminous geometric figure comprising a curve (23,23',24,24') symmetrical about an axis (22). Said curve is symmetrical about an other axis (21) and has at least a first thickness ($e_1$) on one side of a first (21) of the two axes, and at least a second thickness ($e_2$) on the other side of said axis. Application to an optical device for measuring the angular position of a body.

13 Claims, 3 Drawing Sheets

LIGHT SOURCE FOR AN OPTICAL SENSOR AND OPTICAL MEASURING DEVICE USING SAME

The present invention concerns a light source for an optical sensor and an optical measuring device using same.

The general field of the present invention is that of measuring the position of a body, in particular the angular position of a body relative to a frame of reference, in practice a reference plane, the position being measured by means of the relative position or positions of light spots from the source on a linear sensing member.

There is known, in particular from French Pat. No. 76.25996, a light source suitable for use in an optical sensor of the kind briefly described hereinabove.

The light source described in this document is V-shaped. An image of the source is directed, by means of an optical system, for example, onto a linear sensing member, usually in the form of a CCD strip (CCD signifies Charge-Coupled Device and a CCD strip is a strip of charge-transfer photosensitive devices; the expression "CCD strip" is used hereinafter with this sense). The strip is disposed perpendicular to the axis of symmetry of the image of the V-shaped light source. The strip senses the position of light spots which are in fact the intersection of the image of the branches of the luminous V with the strip.

In practice the following arrangements may be used:

the source may be fixed relative to the frame of reference and the strip mounted on the object whose angular position is to be measured;

the source may be mounted on the object whose angular position is to be measured and the strip fixed relative to the frame of reference;

the strip and the source may be mounted on the object whose angular position is to be measured and associated with a mirror fixed relative to the frame of reference or the strip and the source may be fixed relative to the frame of reference and associated with a mirror mounted on the object whose angular position is to be measured.

In all cases the relative position of the light spots mentioned hereinabove on the strip gives the following information:

the distance between them on the strip is a measure of the angle of rotation of the object about an axis parallel to that of the strip, the "centre of mass" between the two light spots is a measure of the rotation of the object about an axis perpendicular to that of the strip.

In some applications these sources and the measuring devices in which they are used have disadvantages.

The applicant has attempted to use sources of this kind with precision optics disposed between the source and the linear sensing member. In some applications, and in particular those with respect to which the applicant has undertaken the research work which has led to the present invention, there is a simultaneous requirement for highly precise measurement and a large amplitude of the angular scale measured. In practice this leads to the use of a relatively high V-shaped light source and consequently the use of one or more optical systems having a particularly large angular field, the size of the field being related to the diameter of the circle passing through the point of the V and the opposite ends of its branches.

As is well known, the cost of an optical system increases with its angular field.

On the one hand, for economic reasons related to the cost of such optical systems the applicant has realised that it is desirable to have a light source enabling measurement of the angular position of an object relative to a reference plane by means of a linear sensing member with the field of the optical system used minimised or at least optimised.

On the other hand, the applicant has noticed that in some applications it is desirable to reduce at least one of the dimensions of the light source so as to reduce its overall size. This advantage is particularly beneficial when using light sources and optical sensors of the aforementioned type in artificial satellites where any saving of space results in a non-negligible economic saving.

The present invention is particularly directed to a source which:

either can be of equivalent size to the prior art source and adapted to be used with an objective lens system with a smaller field and therefore a lower cost, or can be smaller in one dimension at least than the prior art source for the same precision and the same measurement amplitude as the prior art source.

To this end the light source in accordance with the invention, which is in the form of a plane geometrical figure comprising a curve symmetrical to an axis, is particularly characterised in that the curve is also symmetrical relative to another axis and has at least a first thickness on one side of a first of the two axes and at least a second thickness on the other side of that axis.

The present invention is directed to an optical device for measuring the position of a body comprising at least one light source, an optical system and a linear sensing member in which the position of the body is measured by the position of at least one light spot from the light source on the linear sensing member, the optical system receiving directly or indirectly the light from the source and transmitting it directly or indirectly to the linear sensing member, which device is characterised in that the light source is as defined in the previous paragraph.

By this means the disadvantages summarised hereinabove are alleviated.

The V-shaped light source is replaced by a source in the shape of a plane geometrical figure comprising a curve which is not only symmetrical relative to a vertical axis, as in the case of the V, but also symmetrical relative to a second, horizontal axis.

In one particularly preferred embodiment the curve is a lozenge, more precisely a square, and may have a total height equal to that of the V so that the precision of the measured angle of rotation of the object about an axis parallel to that of the strip is the same as in the case of a V of comparable height.

The width of said symmetrical curve can be the same as that of the base of the V, so that the precision of the measured angle of rotation of the object about an axis perpendicular to the sensing strip remains the same.

However, it will be observed that the circle passing through the two points of the symmetrical figure with the greatest width or the greatest height (in this instance, two opposite corners of the lozenge) has a smaller diameter than the circle passing through the point of the V and the opposite ends of its two branches. Consequently, for comparable measurement amplitude the necessary field of the optical system is reduced, which significantly reduces the cost of the optical system.

Additionally, the overall physical size of the light source in accordance with the invention depends also on the diameter of the larger of the two circles mentioned above and as both these circles are smaller than the circle passing through the point of the V and the opposite ends of its two branches it follows that the overall size of the light source in accordance with the invention is significantly reduced relative to the overall size of the prior art V.

With a view to further optimising the field of the optical system used the present invention encompasses two particular embodiments of the light source as briefly explained hereinabove.

In one of these embodiments the source has different thicknesses to each side of the second axis.

In the other of these embodiments the geometrical figure formed by the light source further comprises a rectilinear segment of predetermined thickness differing from said thicknesses joining the two points of intersection of the curve with said axis along said axis of symmetry.

The advantages of both these embodiments will emerge from the description to be given later with reference to the appended drawings.

In a preferred embodiment the light source, which is as defined hereinabove, comprises a primary light source illuminating a mask comprising an aperture with the shape outlined hereinabove.

These arrangements yield a particularly simple and economical implementation of the light source in accordance with the invention.

The optical measuring device in accordance with the invention is advantageously characterised in that the linear member is disposed so that in a so-called neutral position of the body the image of said first axis is colinear with the linear member and in that the device comprises measuring means for sensing the position of the points of intersection of the image of the curve and, where appropriate, that of the segment with the linear sensor and measuring the thickness of said points of intersection, and computing means connected to the measuring means.

These arrangements enable particularly simple implementation of the source and of the device outlined above.

In a preferred embodiment of the device in accordance with the invention a plane mirror is mounted on the body and an optical system is disposed between the mirror and the linear member, the device further comprising a semireflective mirror adapted to reflect part of the light from the source towards the optical system and to allow part of the light from the optical system to pass towards the sensor.

These arrangements enable easy implementation of a device for measuring the angular position of a body relative to a reference plane with no source of energy being required on the body, while the overall size and the cost of the source and the optical system are reduced significantly in comparison with the prior art device using other measuring techniques, the performance of the system being significantly improved.

Figure 2:
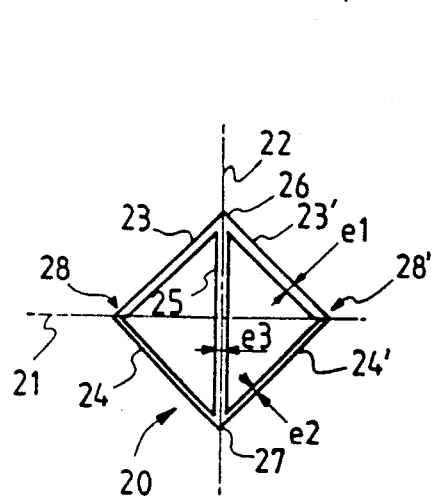
Figure 3:
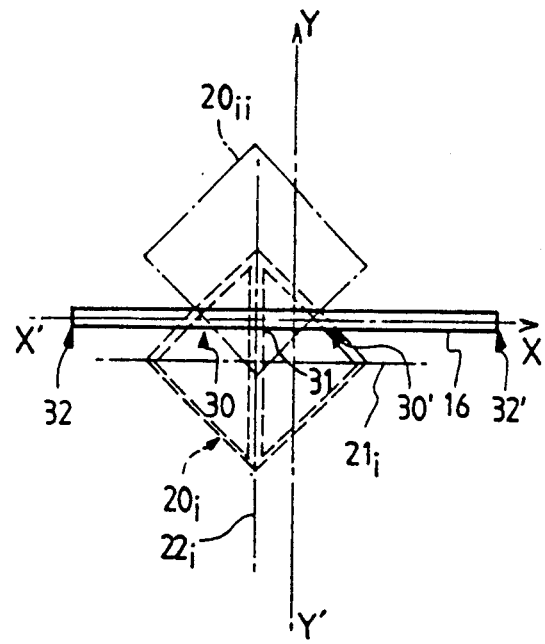
Figure 4:
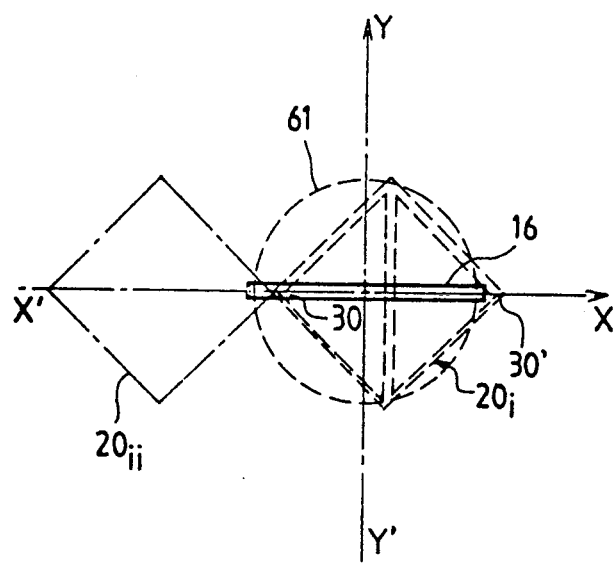
Figure 6:
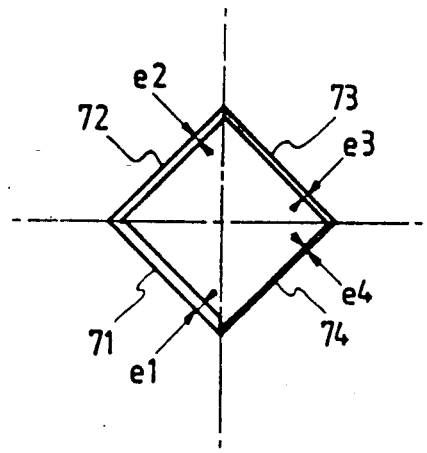
Figure 5:
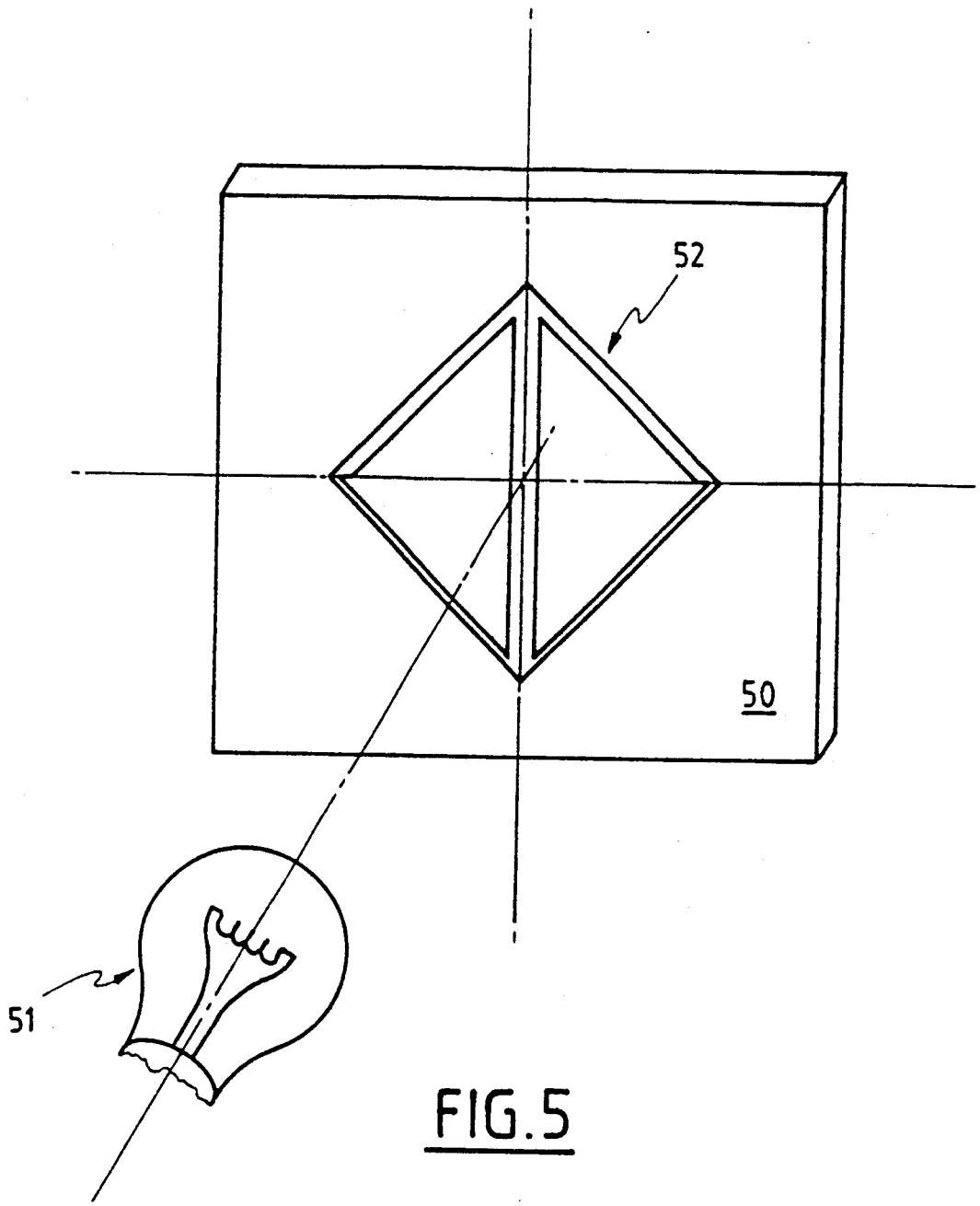

The characteristics and advantages of the invention will emerge from the following description with reference to the appended drawings in which:

FIG. 1 is a theoretical diagram of a preferred embodiment of an optical measuring device in accordance with the invention, FIG. 2 is a view in elevation of a light source in accordance with the invention, FIG. 3 is a schematic view in elevation of the same source in the plane of a linear sensing member, FIG. 4 is schematic view corresponding to FIG. 3 showing an alternative embodiment, FIG. 5 is a schematic representation of a preferred embodiment of the source from FIG. 2, and FIG. 6 is a view in elevation of another embodiment of the source shown in FIG. 2.

In the selected embodiment shown in FIG. 1 the measuring device 10 comprises a set of fixed components 11. The measuring device 10 further comprises a mirror 12 mounted on the object whose angular position in space relative to a frame of reference consisting of the fixed set of components 11 is to be measured.

One possible application of this device is to the adjustment and aiming of parabolic antennas. In this case the mirror 12 is mounted on the parabolic antenna as close as possible to its centre and the set of components 11 is mounted in a fixed position, for example on the support structure of the antenna. It is therefore possible, as will emerge from the following description, to measure the angular position of the mirror, and consequently that of the antenna, relative to the frame of reference then constituted by the support structure of the antenna.

An application of this kind is particularly beneficial in the case of an antenna mounted on board an artificial satellite.

In the embodiment described and shown the set of components 11 comprises a light source 20 which will be described in more detail with reference to FIGS. 2 through 5, a semireflective mirror 14, an optical system 13 and a linear sensing member 16 in the form of a CCD strip.

FIG. 1 shows the vertical axis $\theta$ of rotation of the mirror 12. Note that this axis of rotation is parallel to an axis y'y passing through the centre of the linear sensing member 16. Also shown is an axis $\phi$ perpendicular to the axis $\theta$. The axis $\phi$ intersects the axis $\theta$ at the centre of the mirror 12. Note that this axis is parallel to an axis x'x which is colinear with the linear sensing member 16. The axes $\phi$ and $\theta$ define a reference plane fixed relative to the set of components 11, rotation of the mirror 12 about the axes $\phi$ and $\theta$ being measured as explained later.

FIG. 1 shows that the optical system 13 is colinear with an axis 17 joining the point of intersection of the axes $\phi$ and $\theta$ and that of the axes x'x and y'y.

An axis 18 parallel to the axis y'y lies in the plane of the semireflective mirror which is inclined at 45° to the axis 17 and at 45° to an axis 19 joining the centre of symmetry of the source 20 (which will be defined later with reference to FIG. 2) to the point of intersection of the axes 17 and 18.

A schematically represented boundary 15 separates the fixed components 11 from the mobile mirror 12.

Apart from the source 20 which is part of the invention all other components from FIG. 1 described so far are well known to those skilled in the art. It is therefore unnecessary to describe them in more detail here.

Note, however, that in accordance with the present invention the optical system 13 is such that its field is at least equal to the angular range of measurement of variations in the angular position of the mirror 12, the pupil of the optical system being placed on the plane defined by the axes φ and θ (the neutral position of the mirror), the plane x'x - y'y being an image plane.

Computing means 90 are connected to the component 16.

FIG. 2 shows a particulary simple embodiment of the source in accordance with the invention and a variation on this embodiment enabling the field of the optical system to be reduced.

Generally speaking, in accordance with the invention the source 20 is in the form of a plane luminous geometrical figure comprising a curve symmetrical to two axes and having a first thickness on one side of one of the axes and a second thickness on the other side of that axis.

In the selected embodiment shown the symmetrical curve is a lozenge, more precisely a square, with respective sides 23, 23', 24, 24'. This curve is therefore symmetrical relative to one axis, in this instance the vertical axis 22, and symmetrical relative to another axis, in this instance the horizontal axis 21.

In accordance with the characteristics of the invention mentioned above, the luminous curve defining this lozenge has a first thickness $e_1$ on one side of a first of the two axes, in this instance the horizontal axis 21, and a second thickness $e_2$ on the other side of this axis. Note that the lines defining the luminous sides 23, 23' have a thickness $e_1$ whereas the lines defining the luminous sides 24, 24' have a thickness $e_2$.

The luminous lines 23, 23', 24, 24' may be obtained in any way known to those skilled in the art.

FIG. 5 shows the following embodiment: the light source essentially comprises a primary light source 51 made up of STANLEY H. 2000 type light-emitting diodes. This primary light source 51 illuminates an opaque mask 50 incorporating a series of apertures 52 reproducing the shape described with reference to FIG. 2. This particularly simple embodiment makes it possible to guarantee that the luminous lines 23, 23', 24, 24' have different predetermined thicknesses in accordance with the invention, the reason for these characteristics being explained hereinafter.

Note also that the light source shown in FIG. 2 incorporates a vertical fifth luminous line 25. This luminous line 25 of thickness $e_3$ represents an alternative embodiment of the invention to be explained later.

The functioning of the light source made up of the luminous lines 23, 23', 24, 24' will now be explained with reference to FIGS. 1 through 3.

Referring to FIG. 1, where it is represented only schematically, the light source 20 emits a luminous signal towards the semireflective mirror 14, as represented schematically by the arrows 41.

As the mirror 14 is a semireflective mirror some of the light passes through it and is lost.

Some more of the light is reflected towards the optical system 13, as represented by the arrows 42. The light passes through the optical system 13. The mirror 12 reflects the light (arrows 44) which passes again through the optical system and which also passes through the semireflective mirror (arrow 45). An image $20_i$ is formed in the plane x'x - y'y.

It will be understood that if the mirror 12 is in the plane of the axes φ and θ as shown in full outline in FIG. 1, the image formed in the plane x-y will be a square with axes imaging the the axes 21, 22 colinear with the axes x'x - y'y.

If the mirror 12 is tilted by rotating it a few degrees about the axes φ and θ the image in the plane x-y will be that of a square in which the axes imaging the axes 21, 22 will be offset relative to the axes x'x and y'y. This situation is shown in FIG. 3.

FIG. 3 shows the axes x'x and y'y and the linear sensor which in this embodiment is a CCD strip. The linear sensor has two ends 32, 32'.

An image $20_i$ of the source 20 is shown in dashed outline. The images $21_i$ and $22_i$ of the respective axes 21 and 22 of the source 20 are shown. Note that in the selected example the image $20_i$ is offset downwards and towards the left in the figure, which corresponds to rotation of the mirror about the φ and θ axes as follows:

anticlockwise about the axis θ, and clockwise about the axis φ.

The corresponding position 12a of the mirror 12 is shown in FIG. 1 in chain-dotted outline, the directions of rotation being schematically represented by the arrows 48 and 49, respectively.

There is a one-to-one relationship between the position of the mirror 12 and that of the image $20_i$ of the source 20:

rotation of the mirror 12 about the axis θ corresponds to displacement of the image $20_i$ along the axis x'x, rotation of the mirror 12 about the axis φ corresponds to displacement of the image $20_i$ along the axis y'y.

Assuming that the field of the optical system encompasses all of the strip 16 and that rotation of the mirror about the axes φ and θ is limited so that the image $20_i$ always intersects the strip 16, the thickness and the position of the points of intersection 30, 30' between the image $20_i$ and the strip 16 provide a measure of the rotation of the mirror about the axes, as explained hereinafter.

Note firstly that the points of intersection 30, 30' correspond to the intersection:

either of the image of the luminous lines 23, 23' with the axis x'x, or of the luminous lines 24, 24' with the axis x'x.

This intersection is physically represented by light spots on the CCD strip. These light spots illuminate a certain number of pixels of the strip at the locations corresponding to said intersections.

Information as to the number and location of the pixels illuminated is transmitted to the computing means 90 which interprets this information as follows:

The absolute value of the distance between the points 30, 30' depends on the position of the image $20_i$ along the axis y'y and therefore on the rotation of the mirror about the axis φ. Thus the larger the value of the angle φ the closer together are the points 30, 30', the angle φ having a null value if the points 30, 30' correspond to the image of the points 28, 28' of the source.

However, there is uncertainty as to the sign of the angle about the axis φ. When the light spots 30, 30' are sensed by the strip 16 they could correspond to a position of the image as shown at $20_i$ or to a position of this image as shown at $20_{ii}$.

According to the invention this uncertainty is resolved by virtue of the characteristic of the invention whereby the luminous lines 23, 23' and 24, 24' have different thicknesses.

Thus in the position $20_i$ of the image of the source 20 the light spots 30, 30' will have a relatively large area related to the thickness $e_1$ of the luminous lines 23, 23' and consequently a large number of pixels, contained within a predetermined range are illuminated. On the other hand, in the position $20_{ii}$ of the image the light spots situated at the same location would have a much smaller area related to the thickness $e_2$ of the branches 24, 24', which is less than the thickness $e_1$ of the branches 23, 23' of the light source 20, and a smaller number of pixels contained within a second predetermined range are illuminated.

Linear optical sensors currently available on the market and in particular the CCD strip used in the present embodiment, which is of the FAIRCHILD 143 type with 2048 pixels, have sufficient resolution (13 $\mu$m) to distinguish between a light spot with an area related to the thickness $e_1$ and a light spot related to the thickness $e_2$.

To give an example, in the selected embodiment shown the light source is made up of a square having sides 23, 23', 24, 24' with a length of 18 $\mu$m and the thicknesses $e_1$ and $e_2$ are respectively 145 $\mu$m and 90 $\mu$m.

Given these dimensions, and if the CCD strip used is of the FAIRCHILD 143 type, the number of pixels illuminated are respectively eleven and seven.

The position of the light spots 30, 30' and in particular the position of the "centre of mass" of the spots along the linear sensing member 16 gives a measure of the rotation of the mirror about the axis $\theta$.

Note that the light source 20 makes it possible to measure angular displacements about the axes $\phi$ and $\theta$, of the same total amplitude as a prior art V-shaped light source with exactly the same height as the lozenge (in this instance the diagonal of the square: the distance between the points 26 and 27) and the base of which would be equal to the width of the lozenge (in this instance the diagonal of the square between the points 28 and 28'). Given this hypothesis, the optical system 13 would have to feature an angular field the minimum magnitude of which would be such as to encompass at least a circle passing through the point of the V and the opposite ends of its two branches, whereas in the present case the optical system 13 has only to cater for a field encompassing a circle whose diameter is equal to the diagonal of the square and which is consequently significantly smaller than the abovementioned circle.

In the prior art the overall size of the light source 20 also depends on the circle passing through the point of the V and the opposite ends of these two branches. In the context of the invention the comparable circle is that circumscribing the square. It follows that for comparable ranges of angular measurement the overall size of the source as described in this application is substantially smaller than that of an equivalent source as taught by the prior art.

There will now be described a variant of the invention whereby the field of the optical system used can be significantly reduced and the range of angular measurements increased.

Generally speaking, in accordance with this aspect of the invention the geometrical figure further comprises a rectilinear segment of predetermined thickness different from said thicknesses and joining along one of said axes of symmetry the two points of intersection of the curve with said axis.

This embodiment is also shown in FIG. 2 and is constituted by a fifth luminous line 25 which has a thickness $e_3$ different from the thicknesses $e_1$ and $e_2$. Note that the luminous line 25 extends along the diagonal 26, 26' of the square. As this diagonal is colinear with the axis 22, the points 26, 26' represent the intersection of the curve constituted by the lines 23, 23', 24, 24' with this axis. A source of this kind may be used with an optical system whose field in the plane x-y is limited to a circle 61 (FIG. 4) having a diameter equal to the width of the image of the source 20 (this width corresponding to the image of the diagonal 28, 28').

Provided that the angle of rotation of the mirror 12 about the axis is substantially different from zero, the source functions as previously explained, except that the intersection 31 of the image of the luminous segment 25 with the strip 16 corresponds to the mean position of the light spots 30, 30' so that as a consequence of this the computing means 90 do not need to compute the position but merely to take into account the position of the light spot 31, the latter having an area different to that of the other spot because the luminous segment 25 has a different thickness to the other luminous segments.

On the other hand as the angle of rotation of the mirror about the axis $\phi$ approaches zero there is an area of uncertainty as shown in FIG. 4. FIG. 4 shows an image $20_i$ substantially offset towards the right corresponding to a negative angle $\theta$ and a zero angle $\phi$. Note that although the spot 30 is within the field of the objective lens this is not true of the intersection 30' of the image of the source with the axis x'x. Consequently the point 30' cannot be a light spot and even if the strip 16 covered this point there would be no correponding signal. In this case the computing means 90 are faced with an alternative where the image of the source corresponds to that shown at $20_i$ or to that shown at $20_{ii}$ in this figure.

In the embodiment of the invention currently being described this uncertainty is resolved by the presence of the image of the luminous line 25, more precisely by the presence of the light spot 31 representing the intersection of the luminous line 25 with the CCD strip 16.

Note that by virtue of this embodiment it is possible to use an objective lens whose field is limited in the x-y plane to the size of the image of the source 20.

FIG. 6 shows another embodiment of a mask for removing the area of uncertainty shown in FIG. 4. Note that in this embodiment the light source has four segments 71-74 of different thickness $e_1$-$e_4$.

The images of the four luminous segments therefore have different thicknesses with the result that in each of the four cases a different number of pixels on the CCD strip is illuminated, which makes it possible to recognise the image of the segment intersecting the CCD strip. In this way the uncertainty shown in FIG. 4 can be resolved. According to the thickness of the light spot, it is possible to determine which of the segments 71-74 has its image intersecting the x axis on the CCD strip.

It goes without saying that the present invention has been described by way of non-limiting example only and that numerous variations may be applied to the invention without departing from its scope.

In particular, and especially subject to certain hypotheses whereby the width of the source must be limited, it may be preferable to use a relatively narrow lozenge-shaped curve. Also, the luminous lines 23, 24 are not necessarily rectilinear. In some applications it may be beneficial to use a source in accordance with the invention in which the equivalents of the luminous lines 23, 23', 24, 24' are curvilinear.

Likewise, any curve shape symmetrical with respect to at least two axes may be suitable.

We claim:

1. Light source for use in a device for optically sensing the position of a body measured by the relative position or positions of light spots from the source on a linear sensing member, the source being in the form of a plane luminous geometrical figure comprising a curve symmetrical relative to an axis, characterized in that the curve is symmetrical relative to another axis and has at least a first thickness on one side of a first of the two axes and at least a second thickness on the other side of that axis.

2. Light source according to claim 1 characterised in that said curve has different thicknesses to either side of the second axis.

3. Light source according to claim 1 characterized in that the geometrical figure further comprises a rectilinear segment of predetermined thickness different from said thicknesses joining along one of said axes of symmetry the two points of intersection of the curve with said axis.

4. Light source according to claim 1 characterized in that said curve is a lozenge.

5. Light source according to claim 1 comprising a primary light source illuminating a mask with apertures according to a geometrical figure.

6. Optical device for measuring the position of a body comprising at least one light source, an optical system and a linear sensing member in which the position of the body is measured by the position of at least one light spot from the light source on the linear sensing member, the optical system receiving directly or indirectly the light from the source to transmit it directly or indirectly to the linear sensing member, characterized in that the light source is according to claim 1.

7. Device according to claim 6 wherein a plane mirror is mounted on the body characterized in that the linear member is so disposed that in a so-called neutral position of the body the image of said first axis is colinear with the linear member and in that the device comprises measuring means for sensing the position of the points of intersection of the image of the curve and, where applicable, that of the segment with the linear member and measuring the thickness of said points of intersection, and computing means connected to the measuring means.

8. Device according to claim 7 further comprising an optical system disposed between the mirror and the linear member and a semireflective mirror adapted to reflect some of the light from the source to the optical system and to allow some of the light from the optical system to pass to the linear member.

9. Device according to claim 7 characterized in that the linear member and the measuring means are at least partially constituted by a strip of charge-transfer photosensitive elements.

10. Optical device for measuring the position of a body comprising at least one light source, an optical system and a linear sensing member in which the position of the body is measured by the position of at least one light spot from the light source on the linear sensing member, the optical system receiving directly or indirectly the light from the source to transmit it directly or indirectly to the linear sensing member, characterized in that the light source is according to claim 2.

11. Device according to claim 10 wherein a plane mirror is mounted on the body characterized in that the linear member is so diposed that in a so-called neutral position of the body the image of said first axis is colinear with the linear member and in that the device comprises measuring means for sensing the position of the points of intersection of the image of the curve with the linear member and measuring the thickness of said points of intersection, and computing means connected to the measuring means.

12. Optical device for measuring the position of a body comprising at least one light source, an optical system and a linear sensing member in which the position of the body is measured by the position of at least one light spot from the light source on the linear sensing member, the optical system receiving directly or indirectly the light from the source to transmit it directly or indirectly to the linear sensing member, characterized in that the light source is according to claim 3.

13. Device according to claim 12 wherein a plane mirror is mounted on the body characterized in that the linear member is so disposed that in a so-called neutral position of the body the image of said first axis is colinear with the linear member and in that the device comprises measuring means for sensing the position of the points of intersection of the image of the curve and that of the segment with the linear member and measuring the thickness of said points of intersection, and computing means connected to the measuring means.

* * * * *